US012358616B2

(12) United States Patent
Doo et al.

(10) Patent No.: US 12,358,616 B2
(45) Date of Patent: Jul. 15, 2025

(54) COMPOUND VERTICAL TAKEOFF AND LANDING AIRCRAFT

(71) Applicant: Leviation Technology, Inc., San Diego, CA (US)

(72) Inventors: Johnny Tseng-Pei Doo, Faihope, AL (US); William Doo, Fairhope, AL (US); Tseng-Hua Tsiang, Solana Beach, CA (US)

( * ) Notice: Subject to any disclaimer, the term of this patent is extended or adjusted under 35 U.S.C. 154(b) by 0 days.

(21) Appl. No.: 18/496,850

(22) Filed: Oct. 28, 2023

(65) Prior Publication Data

US 2024/0140598 A1 May 2, 2024

Related U.S. Application Data

(60) Provisional application No. 63/421,570, filed on Nov. 2, 2022.

(51) Int. Cl.
  *B64C 27/10* (2023.01)
  *B64C 27/28* (2006.01)
  *B64C 27/52* (2006.01)

(52) U.S. Cl.
  CPC .............. *B64C 27/10* (2013.01); *B64C 27/28* (2013.01); *B64C 27/52* (2013.01)

(58) Field of Classification Search
  CPC ......... B64C 27/10; B64C 27/28; B64C 27/52; B64C 29/0025; B64C 29/0033; Y02T 50/60
  See application file for complete search history.

(56) References Cited

U.S. PATENT DOCUMENTS

| 7,584,923 B2 * | 9/2009 | Burrage | B64C 29/0033 244/17.23 |
| 7,946,526 B2 * | 5/2011 | Zimet | B64U 30/24 244/17.23 |
| 9,321,526 B2 | 4/2016 | Fink et al. | |

(Continued)

OTHER PUBLICATIONS

Guimbal, Cabri G2 Specification & Features, Mar. 2017—Retrieved from guimbal.com/downloads/1-Cabri-G2-Specifications-Geatures-Update-Mar-2017.pdf on Oct. 20, 2023.

(Continued)

*Primary Examiner* — Valentina Xavier
(74) *Attorney, Agent, or Firm* — Themis Law; Franco A. Serafini

(57) ABSTRACT

A compound vertical takeoff and landing aircraft includes a fuselage with a modular payload configuration for passenger, cargo, or medical transport functions; contra-rotating main rotors mounted on an upper side of the fuselage and driven by at least one motor; and a plurality of tiltable thrusters mounted respectively at a forward section and at an aft section of the fuselage, each tiltable thruster being powered by one or more separate motors. The motors driving the contra-rotating main rotors and the tiltable thrusters may all be electric. The tiltable thrusters may be ducted or unducted and may each be provided with one or more control surfaces at an aft end. Battery modules may be located underneath a floor of the fuselage and may be arranged in one or more groups of batteries so as to so as to facilitate removal and replacement of the batteries.

17 Claims, 8 Drawing Sheets

(56) References Cited

U.S. PATENT DOCUMENTS

| | | | |
|---|---|---|---|
| 10,953,982 B2* | 3/2021 | Moffitt | B64C 27/32 |
| 2009/0159740 A1* | 6/2009 | Brody | B64C 27/10 |
| | | | 244/60 |
| 2018/0334251 A1 | 11/2018 | Karem et al. | |
| 2020/0108919 A1* | 4/2020 | Sada | B64C 27/20 |
| 2023/0140370 A1* | 5/2023 | Wang | B64D 31/00 |
| | | | 244/17.21 |

OTHER PUBLICATIONS

Bell, Bell 429 Overview—Retrieved from bellflight.com/products/bell-429 on Oct. 20, 2023.

Volocopter Volocity, Vertical Flight Society eVTOL News—Retrieved from evtol.news/volocopter-volocity on Oct. 10, 2023.

Sikorsky X2 Light Helicopter Demonstrator, Army Technology—Retrieved from https://www.army-technology.com/projects/sikorskyx2demonstrat on Oct. 20, 2023.

Wang, J., Weight and Performance Estimation for eVTOL aircraft, 2022—Retrieved from ocw.snu.ac.kr/sites/default/files/NOTE/4%20Weight%20and%20Performance%20Estimation.pdf on Oct. 21, 2023.

* cited by examiner

COMPOUND VERTICAL TAKEOFF AND LANDING AIRCRAFT

FIELD OF THE INVENTION

The present invention relates to a compact, quiet and multi-purpose vertical takeoff and landing aircraft. More particularly, the present invention relates to a family of compact multi-purpose electrical vertical takeoff and landing (eVTOL) aircraft, in which the integration of configuration and system design provides simplicity and system redundancy for enhanced safety and operational flexibility with low operating noise.

In one aspect, the present invention relates to a novel design and system integration for a family of eVTOL aircraft having direct electric drive contra-rotating main rotors for primary lift and articulating thrusters that provide additional lift, flight control, and cruise propulsion for maximum flight efficiency and performance. In another aspect, the present invention relates to eVTOL aircraft (including helicopters) designed to have a broad range of size and payload and achieve better hovering capability and efficiency than multi-rotor type eVTOL aircraft, and better cruise efficiency and speed than traditional helicopters, by having main rotors that provide lift and thrusters that provide propulsion force without tail rotors.

BACKGROUND OF THE INVENTION

Electric vertical takeoff and landing (eVTOL) aircraft that are presently in development leverage multi-rotor configuration to take advantage of the simplicity and design flexibility provided by electric motor drive systems but also have significant limitations.

The multi-rotor type design, similar to that of consumer drones, tends to have limited lifting efficiency due to the small diameter of the rotor design. Moreover, those new eVTOL aircraft do not have good cruise efficiency and range.

Those eVTOL aircraft that emphasize cruise range and efficiency commonly use wings with tilting or fixed rotors but still provide low hovering efficiency. More generally, fixed-wing aircraft are more efficient but require a runway, and the required wing spans limit the number of aircraft that can operate within a specific field space. Traditional helicopters instead are good for hovering, but have limited cruise efficiency and speed, a mechanical system that is complex with many single-point failure conditions, and high rotor noise, all of which limit possible use in many situations.

SUMMARY OF THE INVENTION

It is an object of the present invention to provide an aircraft design that produces an eVTOL that is compact, quiet, reliable, and utilizes a structure that is easy to manufacture.

It is another object of the present invention to offer a quiet platform with high cruise speed and efficient hovering operations. The power system can be either fully electric or a hybrid-electric system that can be tailored according to mission needs.

It is yet another object of the present invention to provide an eVTOL that has a flexible design configuration, and that can be used as a personal air vehicle, air taxi, aerial medical platform, cargo transporter, and emergency responder unit. Such compact design allows the 2-seat version to fit within a cargo container, or be transported on the highway for a more extended range deployment. The larger platform can instead be fit in a cargo container by folding the blades and the thrusters.

Some of the embodiments disclosed herein center around the innovative concept of integrating an electrically driven, efficient, and quiet main rotor system that generates an efficient flight operation using a set of tiltable fan systems that can provide additional lift, forward thrust, and control of the vehicle.

Some of the design features of an aircraft according to the invention include:

Contra-rotor with multi-rotor control configuration: A design according to the invention features a set of contra-rotating main rotors for lift generation, and a set of multi-rotors at the corners of the vehicle to provide pitch, roll, and yaw control. This eliminates complex helicopter-type flight control mechanisms for the main rotors and leverages electronic multi-rotor type flight management systems for simplicity and cost/weight reduction.

Lift and thrust enhancing multi-rotor thrusters: Multi-rotor thrusters provide pitch and roll control in the horizontal position, and elevons behind the thrusters provide yaw control in hover, takeoff, and landing mode. The thrusters can rotate from 0 to 90° and provide thrust in forward-flight to enhance cruise efficiency and speed. The high cruise speed is enabled by leveraging the build-in high thrust capabilities of the thrusters. The elevon sets provide roll and pitch control and differential thruster angle, and the rotations per minute (rpm) of the thrusters provide yaw and additional pitch controls in cruise.

Quiet contra-rotor system: 3, 4, and 5 blade main rotors with varied swipe angle platform reduces aerodynamic interferes from blade crossing and the resulting noise level.

Direct drive contra-rotating main rotor: Each main rotor is directly driven by a high-torque electric motor that eliminates complex transmission systems and increases reliability. The lift control is accomplished by the rotor rpm variation, enabled by the small diameter rotors as compared to traditional helicopters. Complementary lift control is accomplished by the thrusters' rpm in vertical mode and elevon deflections in cruise mode, leveraging the fast response characteristic of the small thruster rotor diameters and elevon deflections.

RPM main rotors lift controls: The main rotors are directly driven by an electric motor and control the lift by varying motor rpm, and the complex rotor head blade-control mechanisms of traditional helicopters are eliminated.

Vehicle transportability: The main rotors, the thrusters, and the overall vehicle configuration is designed to fit into standard cargo containers for reduced shipping cost and increased roadability during deployment.

Multi-purpose eVTOL: The aircraft is designed with a modular fuselage configuration to accommodate passengers, specialized cargo containers, and air ambulance operations.

Modular fuselage for producibility: The modular fuselage design includes an outer skeleton primary structure and a plug-in cabin module that can be configured for different functions and missions. The modular design allows mass production of skeleton-type main structures and matching cabin modules, as required for different missions, to enhance cost-effectiveness.

Flexible onboard charging or battery swap system: The battery power system is designed as a modular system that can be a plug-in charge onboard the aircraft, or a battery swap can be performed for quick turn-around mission needs. The longitudinally positioned battery sets are composed of multiple (for example, 3 to 5) bays of battery elements with stainless steel sheets providing protection as a firewall. An extra bay allows additional range-extender batteries to be added to the aircraft for longer range missions at the reduction of equivalent payload. The batteries are configured and sized to allow removal and replacement by one person; only a simple adjustable height loader is required.

BRIEF DESCRIPTION OF THE DRAWINGS

The drawings constitute a part of this specification and include exemplary embodiments of the invention, which may be embodied in various forms. Therefore, the enclosed are not to be considered to be limiting the scope or breadth of the invention.

DETAILED DESCRIPTION OF EMBODIMENTS OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Further, the terminology used herein is for the purpose of describing particular embodiments only and is not intended to be limiting of the invention. For example, the term "and/or" includes any and all combinations of one or more of the associated listed items. Also as used herein, the singular forms "a," "an," and "the" are intended to include the plural forms as well as the singular forms, unless the context clearly indicates otherwise.

It will be further understood that terms, such as those defined in commonly used dictionaries, should be interpreted as having a meaning that is consistent with their meaning in the context of the relevant art and of the present disclosure, and will not be interpreted otherwise unless expressly so defined herein.

In describing the invention, a number of techniques and steps will be disclosed. Each of these has individual benefits, and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. While numerous specific details will be set forth to facilitate an understanding of the present invention, a person of skill in the art will appreciate that the invention may be practiced without those specific details.

The invention relates to compound vertical takeoff and landing aircraft systems that have contra-rotors and tiltable thrusters. In one embodiment, the aircraft is an electric vertical takeoff and landing aircraft (eVTOL) that is more compact and that is quieter than vertical takeoff and landing aircraft in the prior art.

Figure 1:
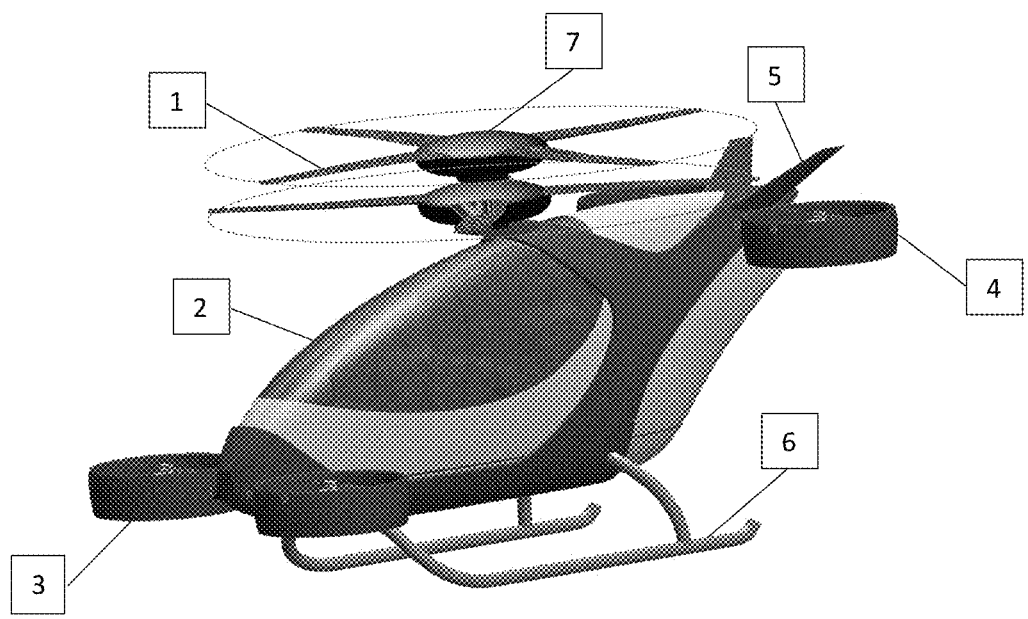
FIG. 1 is a perspective view of an overall configuration of an aircraft according to the invention and shows the contra-rotating main rotors on top, the streamlined multi-functional fuselage in the center, and the four articulating thrusters at four corners of the aircraft in the horizontal position for takeoff and landing or during hovering.

FIG. 1 depicts an exemplary configuration of an eVTOL according to the invention. The aircraft includes contra-rotating main rotors 1 (sometimes indicated by individual reference number 1a, 1b) which are mounted on the upper side of a streamlined, multi-functional fuselage 2, and four tiltable thrusters, of which two front thrusters 3 and two aft thrusters 4 are mounted respectively at a forward section and at an aft section of the fuselage. In different embodiments of the invention, a plurality of tiltable thrusters may be used that is different than four.

The contra-rotating main rotors 1 are powered by a single motor or each of main rotors 1a, 1b may be powered by an individual motor. In one embodiment, the contra-rotating main rotors 1a, 1b are each powered by dedicated electric motors 7a, 7b (collectively indicated by reference number 7 from time to time) and, in another embodiment, the contra-rotating main rotors 1 are powered by a redundant power system. The motors or motors 7 are designed to generate sufficient power so as to provide sufficient lift to one of the main rotors 7a, 7b in the event that the other one of the main rotors 7a, 7b ceases to function.

The contra-rotating main rotors 1a, 1b do not require the use of the conventional helicopter tail rotor by canceling out the torque generated by the individual main rotors. Instead, the contra-rotating main rotors 1 provide the primary lift and control the lift by varying power input and rotations per minute (rpm) of the electric motor or motors, and compensate the differential lift of the advancing vs. the retrieving blade in forward flight. Using this design, the complex blade control mechanism found on traditional helicopters is eliminated, significantly enhancing reliability.

The contra-rotating main rotors 1a, 1b are preferably multi-blade and of smaller diameter that traditional helicopters, which provides for a compact overall vehicle size, a low rotational moment of inertia for responsive rpm control, and low tip Mach number for low rotor noise. In one embodiment, each of the contra-rotating main rotors 1a, 1b has two to four blades with a tip Mach number that is no higher than 0.75 in hover.

By way of comparison, for a two-seater design, a traditional helicopter like the Robinson R-22 has a main rotor diameter of 25.2 ft, while the two-seater version of an aircraft according to the invention can have a main rotor diameter of 9.8 ft when two 3-4 blade contra-rotating rotors are used with wider chord blades. In this example, the two-seater aircraft according to the invention can fit into a standard cargo container for transportation or rapid deployment without disassembling any parts.

The embodiment depicted in FIG. 1 further includes four tiltable thrusters 3, 4 for takeoff and landing or for hovering flight. The tiltable thrusters 3, 4 are mounted at the four horizontal corners of the aircraft and are each powered by an individual motor, which, in the present embodiment, is a separate electric motor. Each electric motor is dimensioned to have redundant power over cruise power that can provide for a supplemental lift and enable a safe lending during a predetermined amount of time (for example, during five minutes) should one of separate motors cease to function during flight.

In order to maintain aircraft stability, two of the tiltable thrusters 3, 4 rotate clockwise and two rotate counterclockwise. For example, the forward left and aft right thrusters may rotate clockwise and the forward right and aft left motors may rotate counterclockwise.

The tiltable thrusters 3, 4, when used in the vertical thrust position, provide vertical lift enhancement and multi-rotor type motor/rotor thrust for varying flight control without the need for complex helicopter-like main rotors. In the horizontal thrust mode, instead, the tiltable thrusters 3, 4 provide forward thrust for efficient cruise flight or high-speed flight.

In particular, the forward and aft thrusters 3, 4 provide secondary lift and lift control as well as pitch and roll control by adjusting thruster rotor rpm through electric motor controllers. The forward and aft thrusters 3, 4 can tilt to change thrust direction from vertical to horizontal and to in-between positions and can provide, in vertical flight mode, auxiliary lift and flight control by varying thrust to control pitch, roll, and vertical movement, and in forward flight mode, forward thrust and partial auxiliary lift with varying tilt angle and yaw control by varying the thrust of the different tiltable thrusters.

In one embodiment, the contra-rotating main rotors 7 provide 70-90% of the lift power and the plurality of tiltable thrusters provide 30-10% of the lift power. In a particular embodiment, the contra-rotating main rotors 7 provide 80% of the lift power and four tiltable thrusters 3, 4 provide 20% of the lift power. While the thrusters 3, 4 could provide a greater percentage of the total lift power, it is preferable to use the remaining power of the tiltable thrusters 3, 4 for controls in takeoff, landing, and hovering flights by varying the thrust provided by each thruster.

The forward thrusters 3 and aft thrusters 4 may be ducted or unducted. When ducted, the ducts of thrusters 3, 4 provide efficiency amplification and operator and passenger protection. Conversely, open rotor designs reduce the overall weight of the aircraft, providing greater speed capabilities due to reduced weight and the absence of duct drag.

A small V-tail 5 at the rear of the aircraft provides additional directional stability in cruise flight. A helicopter-type landing gear 6 is located at the bottom of the fuselage, and wheeled landing gears can also be fitted for additional flexibility in ground operations and rolling takeoff and landing.

Figure 2:
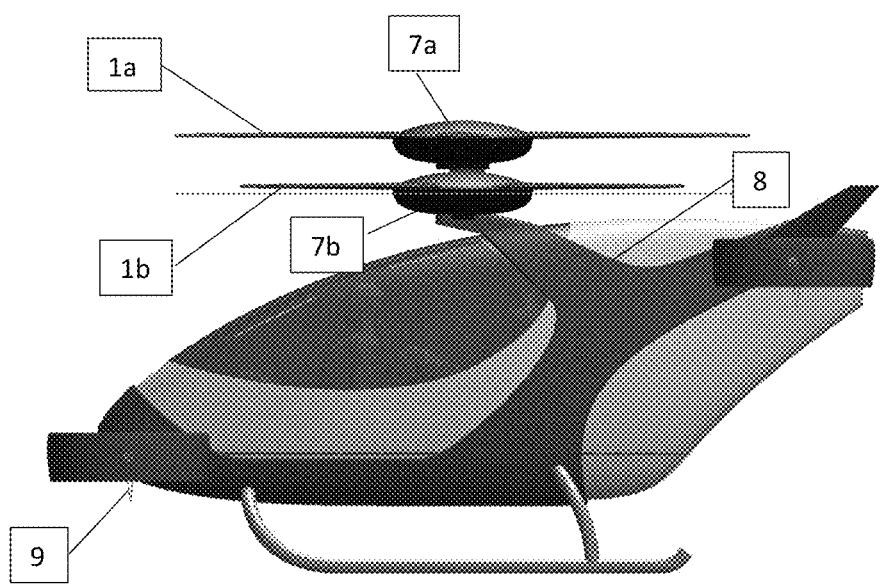
FIG. 2 is a side view of the overall configuration of an aircraft according to the invention, with the thrusters shown in horizontal position.

FIG. 2 illustrates overall the design of an aircraft according to the invention in a side view with the thrusters 3, 4 in horizontal position. As shown in this figure, the upper main rotor 1a and the lower main rotor 1b are driven separately in opposite directions by individual electric motors 7a, 7b, which are either direct drive or with reduction gear and which are mounted on top of the airframe primary load-carrying structure 8. The vehicle yaw control is achieved by differential rpm of these two main rotors, which generate torque along the vertical axis.

Additionally, yaw control can be enhanced by differential deflection of one or more control surfaces (such as the elevons 9 in the present embodiment) behind each thruster in vertical flight mode. The elevons 9 also provide forward-and-aft flight movement control for precision landing and in hover flight mode and pitch, roll, and vertical movement in forward flight mode.

Using separate electric motors for tiltable thrusters 3, 4 takes advantage of the highly reliability of electric motors and avoids the complex cross-shaft transmission of a mechanical system, which is one of the main reasons some that early-day multi-rotor VTOLs have had difficulties in weight, complexity, and reliability, Further, individual motor drives provides for a fast reaction thrust control without a complex blade pitch control mechanisms by varying the rpm of the motors. It is possible to have a motor driving more than one thruster, similarly to the drive train of an electric car, but that would likely require a differential rpm function or blade pitch control to manage thrusts.

Figure 3:
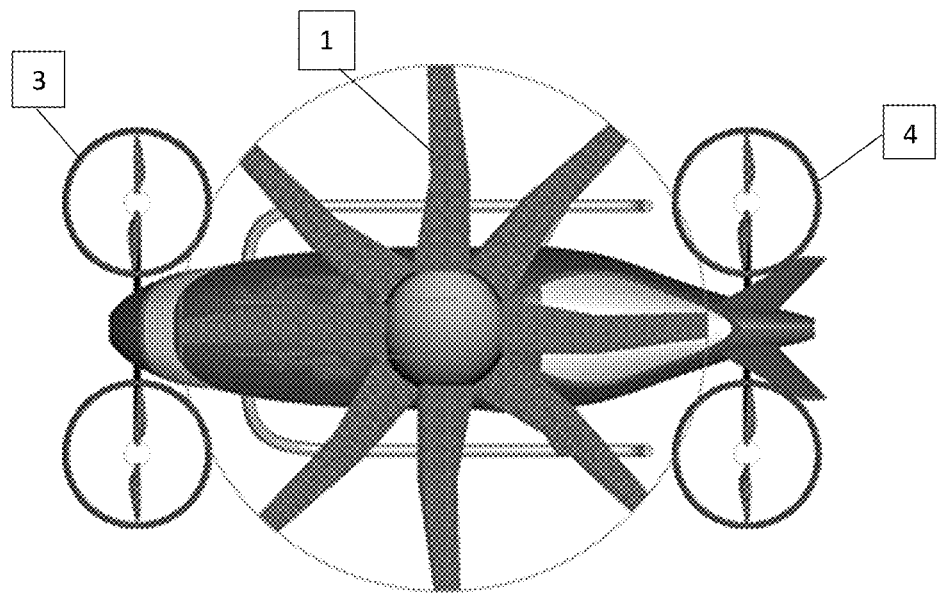
FIG. 3 is a top view of the overall configuration of an aircraft according to the invention, with the thrusters in the horizontal position. The figure illustrates the profiled quiet contra-rotating main rotor with blades tailored for rotating in opposite directions, canceling out torque, and therefore eliminating the traditional helicopter tail rotor.

FIG. 3 is a top view illustration of the overall configuration of an aircraft according to the invention, again with the tiltable thrusters 3, 4 in horizontal position. This figure illustrates the profiled quiet contra-rotating main rotors 1 with blades tailored for rotating in opposite directions, canceling out torque, and thus eliminating the traditional helicopter tail rotor. The design allows the use of three, four, or five-blade main rotor designs tailored for maximum takeoff weight, cruise speed, low noise, operating field space, and the transport size of the vehicle.

The blades of main rotors 1 are designed with swept forward angles on the inboard portion and swept-back angles on the outboard portion to reduce blade crossing interference and achieve better efficiency and lower noise in comparison to a straight blade system. The wide-chord design provides sufficient blade area to generate the required lift with a small rotor diameter and lower aspect ratio blade geometry as compared to traditional helicopters.

The forward thrusters 3 and the aft thrusters 4 are positioned just outside the main rotor downwash to minimize rotor flow interactions and sufficiently apart to provide pitch and roll controls via electric direct motor drive rpm changes. Fixed pitch contra-rotating propellers provide redundancies in case of propeller or motor failure.

Figure 4:
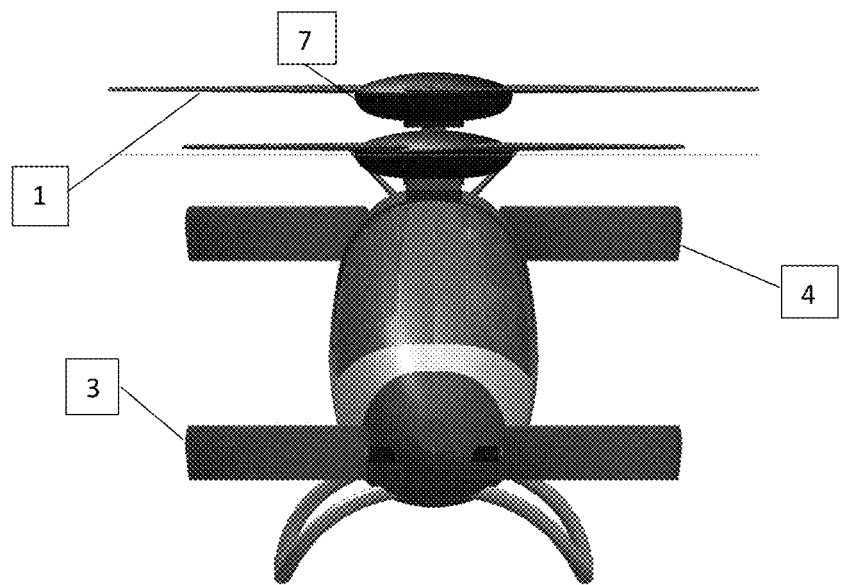
FIG. 4 is a front view of the overall configuration of an aircraft according to the invention, with the thrusters in horizontal position. This figure shows the compact cross-section of the aircraft that allows the aircraft to be transported on a highway or fit into a cargo container.

FIG. 4 is a front view illustration of the overall configuration of the vehicle design with the thrusters 3, 4 in horizontal position. The main rotors 1 can have three or four blades each and can be clocked at 60 degrees or 45 degrees respectively to minimize the width of the overall vehicle and facilitate compact transportation. The forward and aft thrusters 3, 4 are also sized to fit within transport width limitations, so that the aircraft can fit within a regular cargo container or be transported via trailer within highway width limitations. The main rotor motors 7 are housed within aerodynamic fairings to minimize drag.

Figure 5:
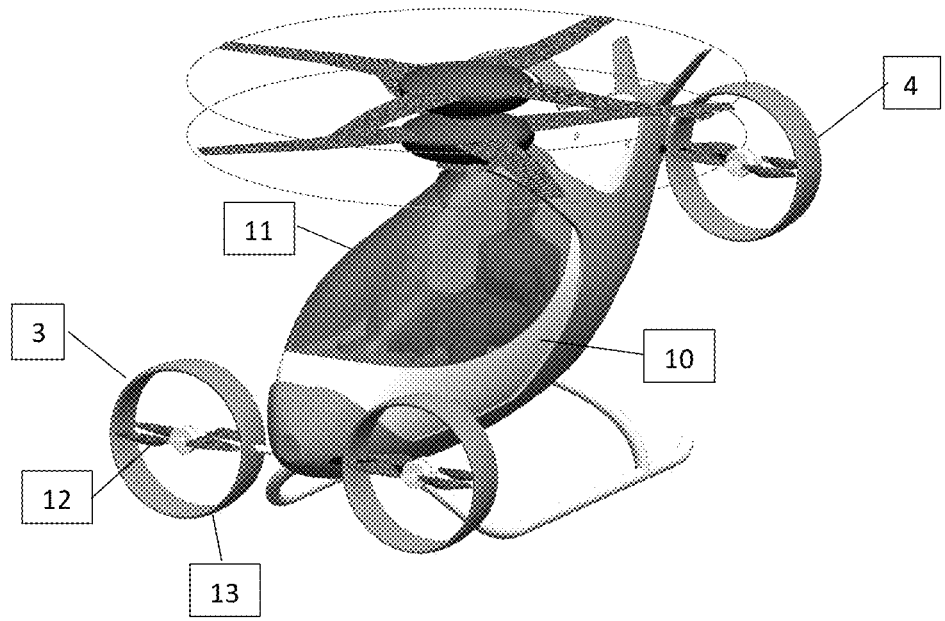
FIG. 5 is an illustration of the overall configuration of an aircraft according to the invention showing the contra-rotating main rotors on top, the streamlined multi-functional fuselage in the center, and four articulating thrusters in vertical position arranged at four corners to generate forward thrust for efficient cruise flight at a higher speed than aircraft in the prior art.

FIG. 5 is an illustration of the overall configuration of the aircraft showing the contra-rotating main rotors 1 on top, the streamlined multi-functional fuselage 10 in the center with large transparent cockpit windows 11, and the four articulating thrusters 3, 4 in vertical position at the four outer corners, so as to generate forward thrust for efficient cruise flight at a higher speed than traditional helicopter designs.

The tilt angles of the thrusters 3, 4 can vary from a +105° to a −10° shaft axis relative to a longitudinal axis of the fuselage. In one embodiment, the tilt angle of the thrusters 3, 4 can be adjusted from horizontal (0±10°) to vertical (90±15°) position, and to a range in-between depending on flight mode and best controllability and performance from hover to cruise and transition, which are controllable by the pilot, remotely, or automatically with flight management computers.

FIG. 5 further shows the propellers 12 of the thrusters housed within the duct 13 of the thrusters 3, 4 for efficiency and protection.

Figure 6:
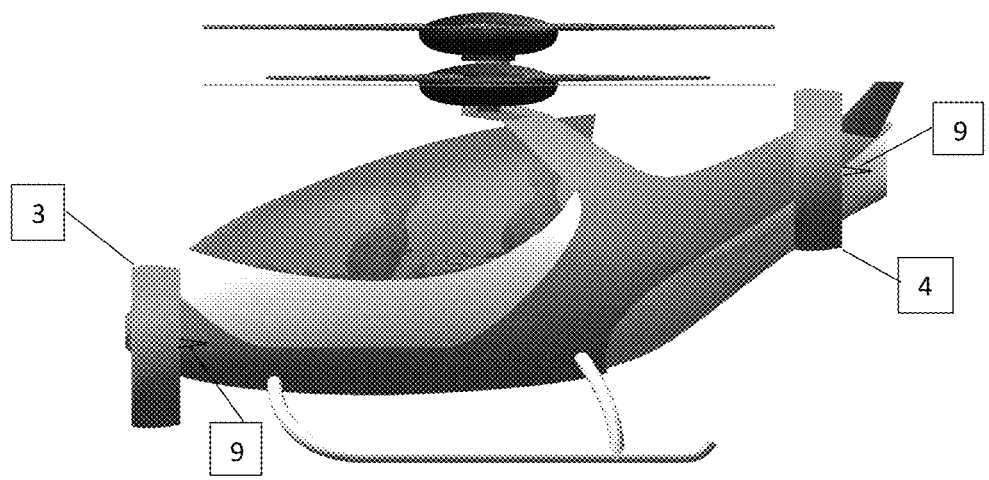
FIG. 6 is a side view of the overall configuration of an aircraft according to the invention, with the thrusters in vertical position for cruise flight. The thrusters are positioned with a height offset to cause front set airflow to not interfere with the aft set of thrusters.

FIG. 6 is a side view illustration of the overall configuration of the vehicle with the thrusters in vertical position for cruise flight. The forward and aft thrusters 3, 4 are positioned with a height offset to cause front thruster airflow to not interfere with the aft set of thrusters. The tilt angles of the forward and aft thrusters can be adjusted differently to provide the best pitch trim forces and thrust performance. Elevon 9 behind each duct, both at the forward and aft thrusters, is used to provide pitch and roll flight control function in cruise mode.

Figure 7:
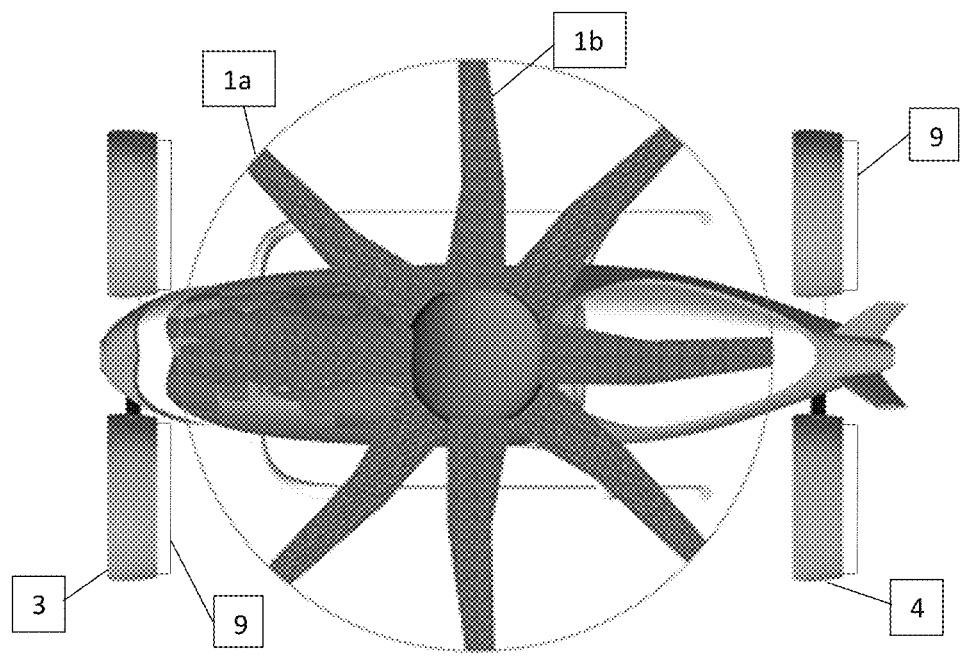
FIG. 7 is a top view of the overall configuration of an aircraft according to the invention, again with the thrusters in vertical position. The figure illustrates the four thrusters in the direction that produces thrust for cruise flight.

FIG. 7 is a top view illustration of the overall configuration of the vehicle design with the thrusters in vertical position. This figure illustrates the four thrusters in the direction that produce thrust for cruise. The yaw control is mainly performed by differential rpm induced torque of main rotor 1a, 1b, complemented by left and right thruster rpm/thrust adjustment.

Figure 8:
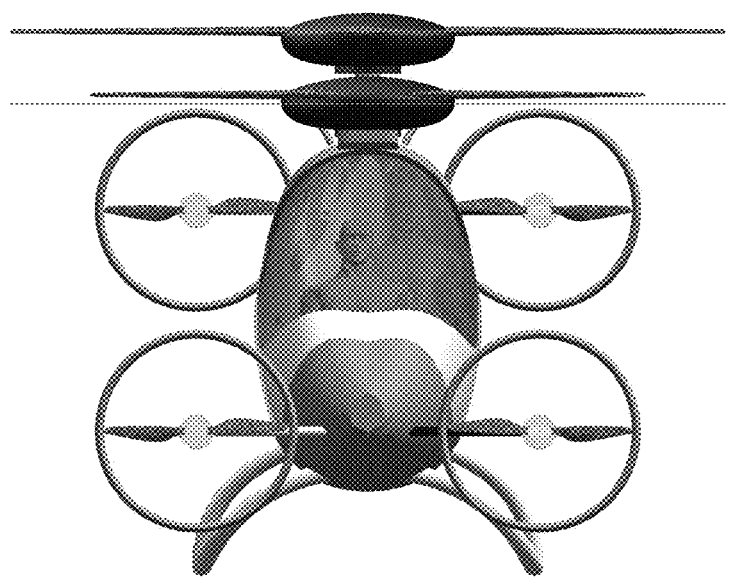
FIG. 8 is a front view of the overall configuration of an aircraft according to the invention, with the thrusters in vertical position for cruise flight.

FIG. 8 is a front view illustration of the overall configuration of the vehicle with the thrusters in cruise position.

Figure 9:
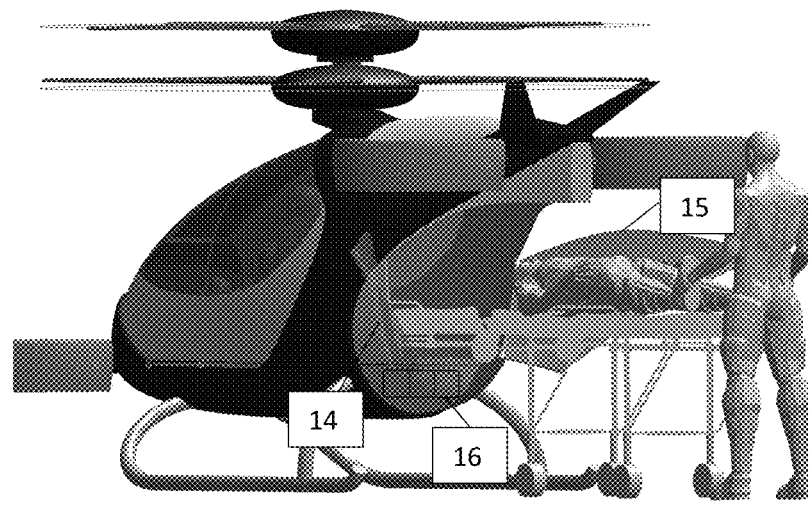
FIG. 9 is an illustration of the cargo door at the rear, which opens wide for loading a medical stretcher, with vehicle floor height designed for the standard wheeled stretcher to be used for loading patients.

The fuselage 2 of the aircraft may be configured for passenger, cargo, or medical transport functions. In different embodiments, access doors to the inner part of the fuselage may be provided in side and/or aft positions. FIG. 9 is an illustration of the cargo doors 14, 15 at the rear when open wide for loading a medical stretcher, with vehicle floor height designed for a standard wheeled stretcher to be used for loading patients.

The electric motors of the aircraft are powered by batteries, which may be positioned under the floor and may be aligned with the length of airframe. Battery bays 16 may be lined with stainless or other fireproof materials in order to create firewalls between the batteries, and between the batteries and the rest of the airframe.

The batteries may be provided in modules, with each of the modules including one or more batteries so as to so as to facilitate removal and replacement of the batteries. Further, the batteries within each module may be grouped in one or more groups so as to further facilitate the preparation and disassembly of the battery modules.

Figure 10:
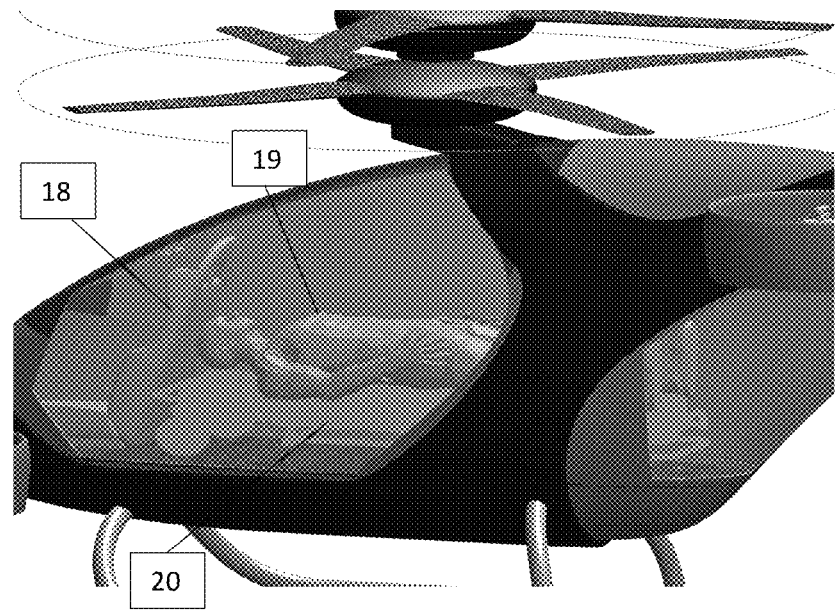
FIG. 10 is a detail illustration of an aircraft according to the invention that can fit a typical stretcher carrying a patient into the cabin. The interior design is such that the front seat can move forward to provide space for the stretcher and the patient. The vehicle can be operated remotely or autonomously.

FIG. 10 is a detail illustration of the vehicle, showing that a typical stretcher 20 with a patient 19 can fit into the cabin. The interior design is such that the front seat 18 would move forward to provide space for the stretcher and the patient. The vehicle can be operated remotely or autonomously for air ambulance operations. The flight management system is designed to accept pre-flight route planning and can perform missions autonomously by pre-programmed takeoff, cruise, and landing functions. Additional sensor suite is also part of the system to detect and avoid fixed or moving obstacles for enhanced safety. With 4G, 5G, and/or satellite data connections, the system further allows a ground-based operator to monitor and take control of the vehicle at any point as the mission requires.

Figure 11:
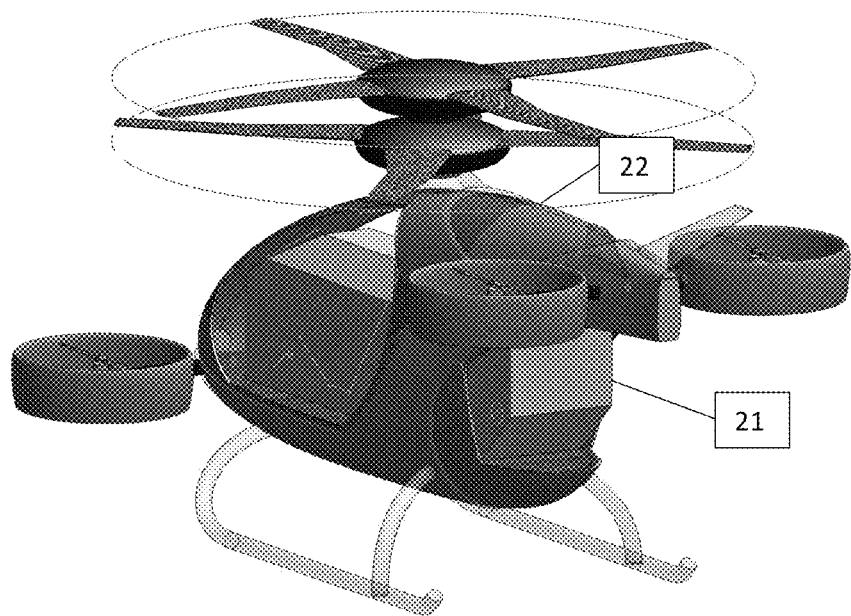
FIG. 11 is an illustration of a customized cargo container loaded into an aircraft according to the invention to allow systematic cargo transport operations. The floor may have a set of rollers installed for easy loading and off-loading, and tie-down devices would secure the container for flight.

FIG. 11 is an illustration of a customized cargo container 21 loaded into the vehicle to allow systematic cargo transport operations. In this embodiment, the floor may have a set of rollers installed for easy loading and off-loading, while tie-down devices would secure the container for flight. An auxiliary bay 22 is located above the cargo area behind the cabin, and is designed to house aircraft system modules and the installation of an optional hybrid electric system power source, either an internal combustion engine, turbine engine, or hydrogen-electric power generation system to extend flight time, range, and flexibility in field operations, so as to optionally enable re-fueling instead of charging.

Figure 12:
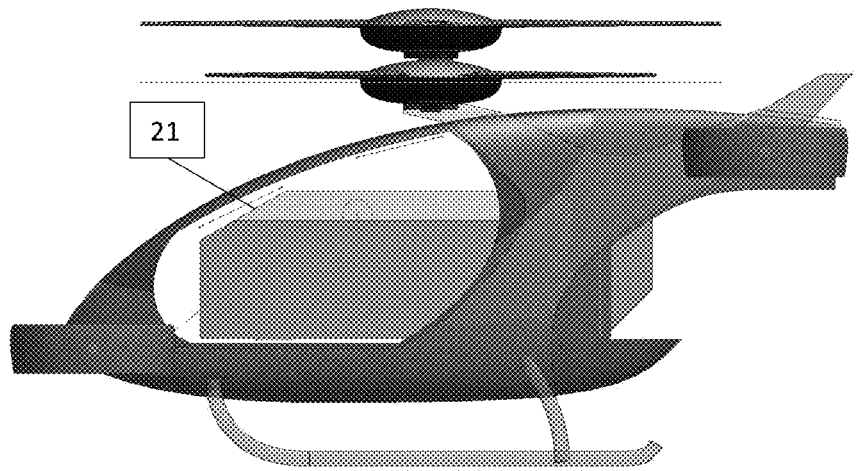
FIG. 12 is a side illustration of the aircraft showing position and configuration with the cargo container loaded. The aircraft can use containers or transport loose packages.

FIG. 12 is a side view illustration of the vehicle in remote flying configuration, which shows the position and configuration with the cargo container 21 loaded. The vehicle can house containers or transport loose packages. The loading and unloading of the container can be performed by a single person with a lift jack or a robotic system. The aft cargo doors are omitted in the figure to better illustrate the cargo container configuration. The cargo operations are intended to be autonomous or remotely piloted to maximize payload, volume, and cost-effectiveness.

Figure 13:
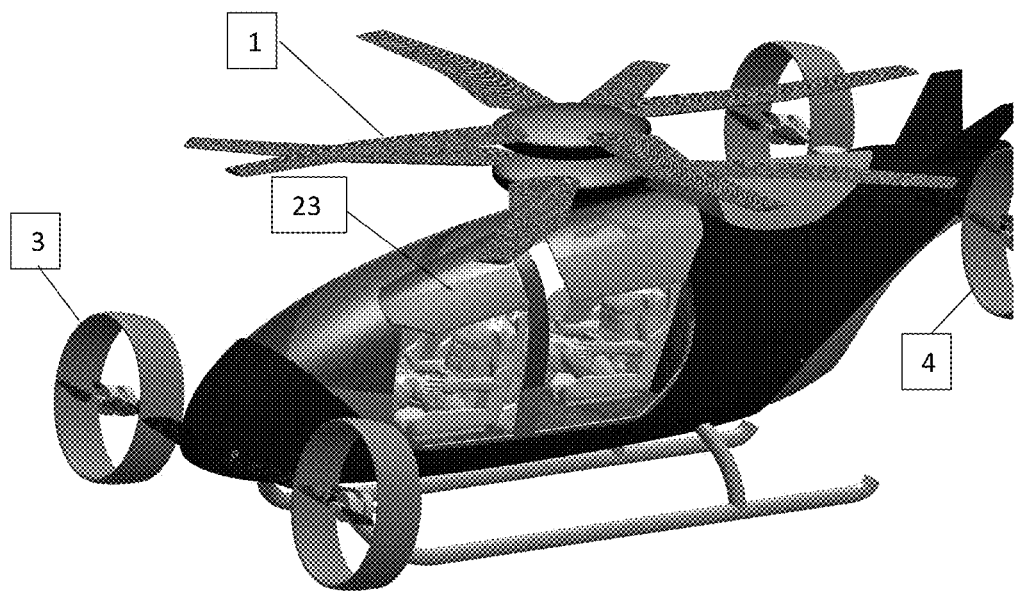
FIG. 13 is a perspective illustration showing the configuration flexibility of an aircraft according to the invention. This figure shows a 4-seat design arrangement with gull-wing doors to provide for easy entrance and egress.

FIG. 13 is an illustration of the aircraft design size and configuration flexibility. This figure shows the 4-seat design arrangement with gull-wing doors 23 to provide for easy entrance and egress. The main rotors 1 are designed to be above most operator and passenger's height for safety and clearance. The forward and aft thrusters 3, 4 are positioned far away from the loading and egress pathways with ducts or shrouds that prevent any accidental touching or damages to the propellers.

Figure 14:
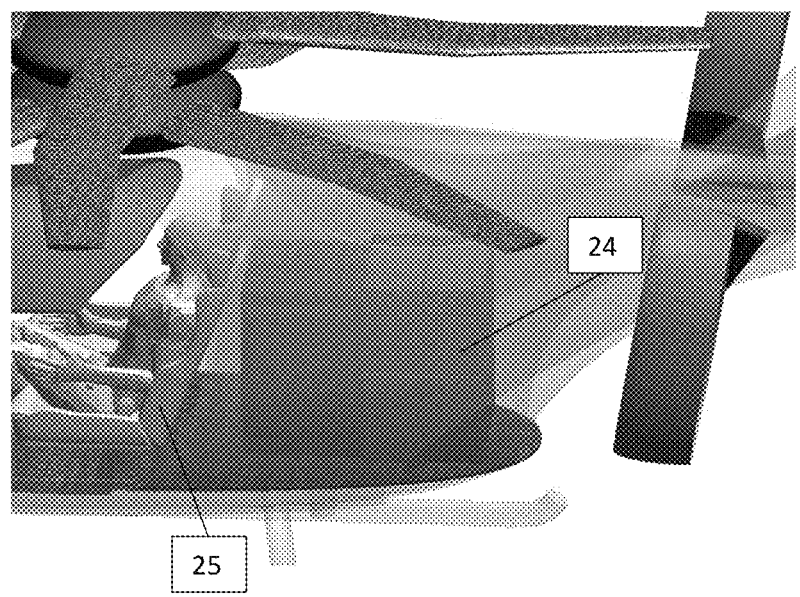
FIG. 14 is a detailed illustration of the luggage loading flexibility of an aircraft according to the invention, with the aft passenger seats foldable to provide additional luggage space as needed.

FIG. 14 is a detail illustration of the luggage loading flexibility of the aircraft. The large aft cargo doors allow easy loading and unloading of luggage 24 of various size combinations. The aft passenger seats 25 can be folded forward to provide additional luggage space as needed.

Figure 15:
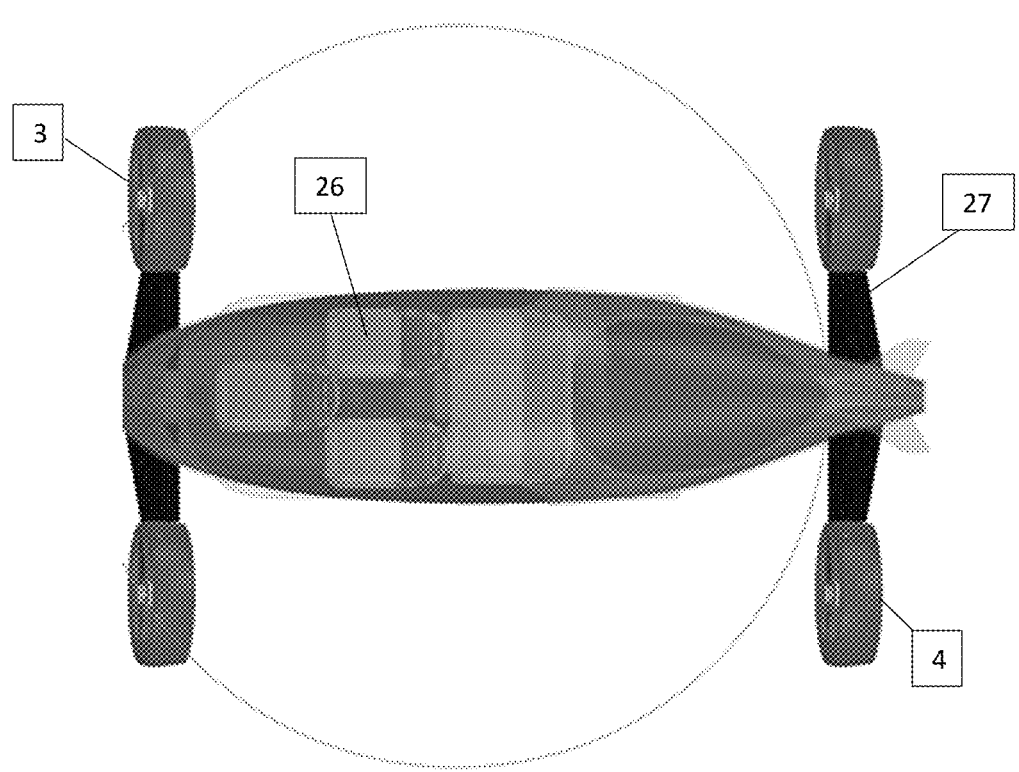
FIG. 15 is an illustration of a possible design of an aircraft according to the invention with a 6-seat cabin with staggered seats. The support-wings of the thrusters are fitted to provide additional cruise lift and extend the thrusters outboard for additional roll control authority.

FIG. 15 is an illustration of a possible vehicle design option that shows the seating arrangements of a 6-seat version with staggered seats 26 to reduce the center of gravity shift under various passenger loading conditions while providing sufficient legroom for passenger comfort. The support wings 27 of thrusters 3, 4 can be added to the 2-seater design, but are fitted mainly on the 4 to 6 seat design to provide additional cruise lift and to extend the thrusters outboard for additional roll control authority and, further, to position the thrusters out of the main rotor downwash flow field.

Figure 16:
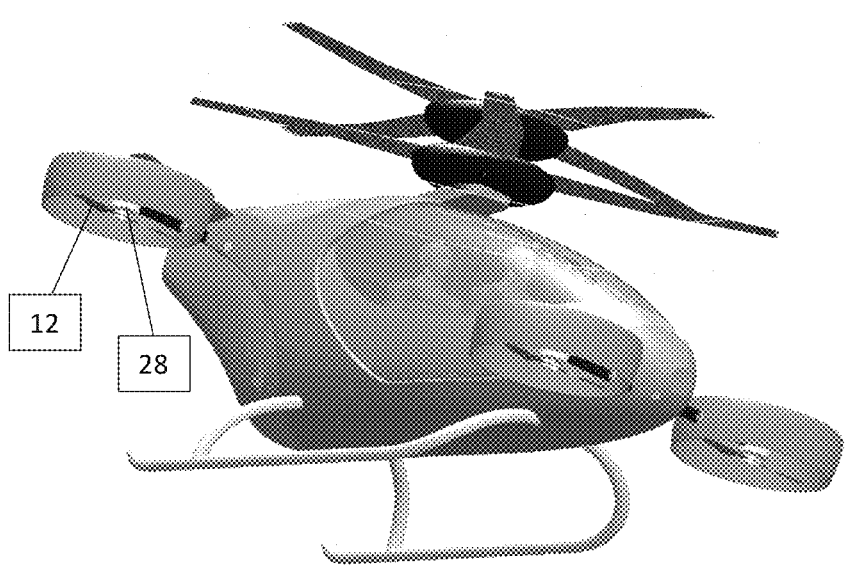
FIG. 16 is an illustration of a design of an aircraft according to the invention showing a possible location of the thruster motors.

FIG. 16 is an illustration of a design according to the invention, in which the tiltable thrusters are ducted and have thruster motors 28 with a rotor 12 installed within the duct. The tiltable thrusters can be of single or dual motor/rotor design.

It can be seen that an aircraft according to the invention combines mechanical simplicity and redundancy of a multirotor eVTOL with a simplified contra-rotating main rotor system so as to achieve a high lifting efficiency and a high cruise speed capability.

In particular, an aircraft according to the invention provides for a simple and robust main rotor structure by eliminating or minimizing the complexity of the rotor blade control mechanical system, resulting in high structural integrity and eliminating single point failure and complexity of the conventional helicopter main rotor system.

In an aircraft according to the invention, the tilting thrusters, when in forward flight mode, provide significant forward thrust to the eVTOL, taking advantage of the high-speed flight capabilities of a compound helicopter. A multirotor eVTOL in the prior art has a limited forward flight speed, around 70 mph, while civilian helicopters range between 115 to 180 mph. An aircraft according to the invention can instead achieve speeds up to 300 mph by having a compound helicopter structure work synergistically with tilting thrusters.

The twin contra-rotating main rotors also provide a high hover lift efficiency, in the range of 8-10 lbs/hp, compared to 5-6.7 lbs/hp for most eVTOL aircraft designs in the prior art. That makes an aircraft according to the invention particularly suitable for operations and missions that require longer hovering flights.

Moreover, the contra-rotating main rotors do not require complex rotor control mechanism of conventional helicopters and can be better optimized for a primary purpose—providing efficient lift at all flight speeds. The low tip Mach design not only reduces noise, but also reduces the high-speed flight advancing the tip Mach induced speed limits of a compound helicopter.

While the invention has been described in connection with the above-described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

What is claimed is:

1. A compound vertical takeoff and landing aircraft comprising:
   a fuselage with modular payload configuration for passenger, cargo, or medical transport functions, the fuselage having an outer skeleton primary structure and a plug-in cabin module; and
   a propulsion system consisting of:
   contra-rotating main rotors mounted on an upper side of the fuselage, the contra-rotating main rotors having that provide a direct electric drive provided by at least one motor; and
   a plurality of tiltable thrusters mounted respectively at a forward section and at an aft section of the fuselage, each tiltable thruster being powered by one or more motors,
   wherein:
   the contra-rotating main rotors provide primary lift and control lift by varying power input and rotations per minute of the at least one motor,
   the contra-rotating main rotors control the lift by varying power input and rotations per minute, a majority of left and right lift differentials generated by an advancing and a retrieving blade in forward flight being compensated automatically by the contra-rotating main rotors and being controllable by adjusting contra-rotation speeds,
   the plurality of tiltable thrusters is configured to tilt to change thrust direction from vertical to horizontal and to in-between positions, so as to provide:
   in vertical flight mode, auxiliary lift and flight control by varying thrust to control pitch, roll, and vertical movement, and
   in forward flight mode, forward thrust and partial auxiliary lift with varying tilt angle, pitch control, and yaw control by varying a thrust of each tiltable thruster.

2. The compound electric vertical takeoff and landing aircraft according to claim 1, wherein the at least one motor powering the contra-rotating main rotors and the one or more motors powering the plurality of tiltable thrusters are electric motors.

3. The compound electric vertical takeoff and landing aircraft according to claim 1, wherein the contra-rotating main rotors are driven by two or more separate motors or by a redundant power system.

4. The compound electric vertical takeoff and landing aircraft according to claim 3, wherein the contra-rotating main rotors consist of two contra-rotating main rotors each powered by a separate motor, and wherein each of the separate motors is designed to have reserve power so as to provide the primary lift and to enable a safe lending during a predetermined amount of time should one of separate motors lose full or partial power during flight.

5. The compound electric vertical takeoff and landing aircraft according to claim 1, wherein the plurality of tiltable thrusters consists of four tiltable thrusters, each tiltable thruster having one or more rotors driven by the one or more motors.

6. The compound electric vertical takeoff and landing aircraft according to claim 1, wherein each tiltable thruster has a single rotor, wherein the plurality of tiltable thrusters are four tiltable thrusters, and wherein two of the four tiltable thrusters have rotors that rotate clockwise and two of the four tiltable thrusters have rotors that rotate counter-clockwise.

7. The compound electric vertical takeoff and landing aircraft according to claim 1, further comprising one or more control surfaces mounted at an aft end of each one of the tiltable thrusters, the one or more control surfaces providing supplemental aircraft control including yaw, forward, and aft movement control in hover flight mode and pitch, roll, and vertical movement in forward flight mode.

8. The compound electric vertical takeoff and landing aircraft according to claim 7, wherein the one or more control surfaces consist of an elevon mounted at the aft end of each tiltable thruster.

9. The compound electric vertical takeoff and landing aircraft according to claim 1, wherein the plurality of tiltable thrusters are ducted.

10. The compound electric vertical takeoff and landing aircraft according to claim 1, wherein the plurality of tiltable thrusters are unducted.

11. The compound electric vertical takeoff and landing aircraft according to claim 1, wherein each of the contra-rotating main rotors has two to four blades with tip Mach number no higher than 0.75 in hover.

12. The compound electric vertical takeoff and landing aircraft according to claim 1, wherein each of the four tiltable thrusters can tilt from +105° to −10° shaft axis relative to a fuselage longitudinal axis.

13. The compound electric vertical takeoff and landing aircraft according to claim 1, wherein the contra-rotating main rotors provide 70-90% of lift power and the plurality of tiltable thrusters provide 30-10% thereof.

14. The compound electric vertical takeoff and landing aircraft according to claim 1, wherein the plug-in cabin module is configured for the passenger, cargo, or medical transport functions by having side and/or aft access doors to the cabin.

15. The compound electric vertical takeoff and landing aircraft according to claim 14, wherein a cabin of the fuselage is sized and configured for multi-function use.

16. The compound electric vertical takeoff and landing aircraft according to claim 1, further comprising battery modules that are located underneath a floor provided in the fuselage, a firewall separating the battery modules from a passenger, cargo, or medical transport cabin, the battery modules comprising one or more groups of batteries so as to so as to facilitate removal and replacement of the battery modules.

17. The compound electric vertical takeoff and landing aircraft according to claim 1, wherein rotor blades of contra-rotating main rotors are designed with swept forward angles on an inboard portion and swept-back angles on an outboard portion so as to reduce blade crossing interference.

* * * * *